(12) United States Patent
Zhang (10) Patent No.: US 10,040,028 B2
(45) Date of Patent: Aug. 7, 2018

(54) METHODS AND SYSTEMS FOR A MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 172 days.

(21) Appl. No.: 14/932,695

(22) Filed: Nov. 4, 2015

(65) Prior Publication Data

US 2017/0120193 A1    May 4, 2017

(51) Int. Cl.

| F01N 3/10 | (2006.01) |
|---|---|
| B01D 53/94 | (2006.01) |
| B01F 3/04 | (2006.01) |
| B01F 5/06 | (2006.01) |
| F01N 3/20 | (2006.01) |
| B01F 5/04 | (2006.01) |

(52) U.S. Cl.
CPC ...... *B01D 53/9431* (2013.01); *B01F 3/04007* (2013.01); *B01F 3/04049* (2013.01); *B01F 5/0485* (2013.01); *B01F 5/0602* (2013.01); *B01F 5/0659* (2013.01); *F01N 3/2066* (2013.01); *B01D 2251/2067* (2013.01)

(58) Field of Classification Search
CPC ..... F01N 3/2066; F01N 1/08; B01D 53/9431; B01F 3/04049; B01F 5/0659

USPC ............ 422/177; 181/251, 257; 60/286, 301
See application file for complete search history.

(56) References Cited

U.S. PATENT DOCUMENTS

| 3,937,449 A | | 2/1976 | Copeland et al. |
|---|---|---|---|
| 5,606,856 A | * | 3/1997 | Linder ............... B01D 53/9431 60/286 |
| 6,722,124 B2 | * | 4/2004 | Pawson ............. B01D 53/9431 422/172 |
| 8,756,923 B2 | * | 6/2014 | Tamamidis ............... F01N 1/08 181/251 |
| 2001/0014301 A1 | | 8/2001 | Nakamura et al. |
| 2009/0031714 A1 | | 2/2009 | Jochumsen et al. |
| 2013/0104531 A1 | | 5/2013 | Cho et al. |
| 2015/0027556 A1 | | 1/2015 | Huang et al. |

FOREIGN PATENT DOCUMENTS

WO    WO 2013117230 A1 *  8/2013   ........... F01N 3/2066

* cited by examiner

*Primary Examiner* — Tom P Duong
(74) *Attorney, Agent, or Firm* — Julia Voutyras; McCoy Russell LLP (57) ABSTRACT

Methods and systems are provided for an exhaust gas mixer. The system comprises a urea injector injecting urea into a perforated tube having a U-shaped bend housed by the exhaust gas mixing chamber. The perforated tube further has an outlet fluidly coupled with an exhaust passage, with an SCR catalyst positioned downstream of the exhaust passage.

17 Claims, 4 Drawing Sheets

METHODS AND SYSTEMS FOR A MIXER

FIELD

The present description relates generally to methods and systems for an engine exhaust gas mixer.

BACKGROUND/SUMMARY

One technology for after-treatment of engine exhaust utilizes selective catalytic reduction (SCR) to enable certain chemical reactions to occur between NOx in the exhaust and ammonia (NH3). NH3 is introduced into an engine exhaust system upstream of an SCR catalyst by injecting urea into an exhaust pathway. The urea entropically decomposes to NH3 under high temperature conditions. The SCR facilitates the reaction between NH3 and NOx to convert NOx into nitrogen (N2) and water (H2O). However, as recognized by the inventor herein, issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between emissions (e.g., NOx) and the SCR. Additionally, overly mixing and agitating the urea in the exhaust can likewise cause issues, such as increased deposits.

Attempts to address insufficient mixing include introducing a mixing device downstream of a urea injector and upstream of the SCR such that the exhaust flow may be homogenous. Other attempts to address urea mixing include a stationary mixing apparatus. One example approach is shown by Cho et al. in U.S. 2013/0104531. Therein, a static mixer is located in an exhaust passage downstream of an external tube for injecting urea. The exhaust gas flows through the exhaust passage and combines with a urea injection before flowing through the static mixer.

However, the inventors herein have recognized potential issues with such systems. As one example, the static mixer described above presents limited mixing capabilities due to a large outlet located in a center of the mixer. In some examples, exhaust may flow directly through the orifice without mixing with other portions of exhaust gas. The static mixer inside the exhaust passage also presents manufacturing and packaging constraints. Varying exhaust passage geometries demand an alteration in the manufacturing of the static mixer for the mixer to tightly fit within the exhaust passage.

In one example, the issues described above may be addressed by a system for a urea injector injecting urea inside a perforated tube housed by a mixing chamber configured to receive exhaust gas, the tube having an outlet end fluidly coupled with an exhaust passage and an SCR catalyst positioned downstream of the exhaust passage. In this way, exhaust gas flows into the mixing chamber and into the perforated tube before flowing through the outlet to the SCR catalyst.

As one example, the exhaust passage is a downstream exhaust passage physically separated from an upstream exhaust passage. The upstream exhaust passage is physically coupled to an inlet of an upstream side of the mixing chamber and directs exhaust flow into the mixing chamber. Urea is injected into an upper portion of the perforated tube through a port vertically higher than the outlet on a downstream side of the mixing chamber. Gas from the upstream exhaust passage flows into the mixing chamber and only flows into the downstream exhaust passage after flowing through the perforated tube. In this way, gas may flow through the tube simultaneous to a urea injection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown to scale, although other relative dimensions may be used if desired.

DETAILED DESCRIPTION

Figure 1:
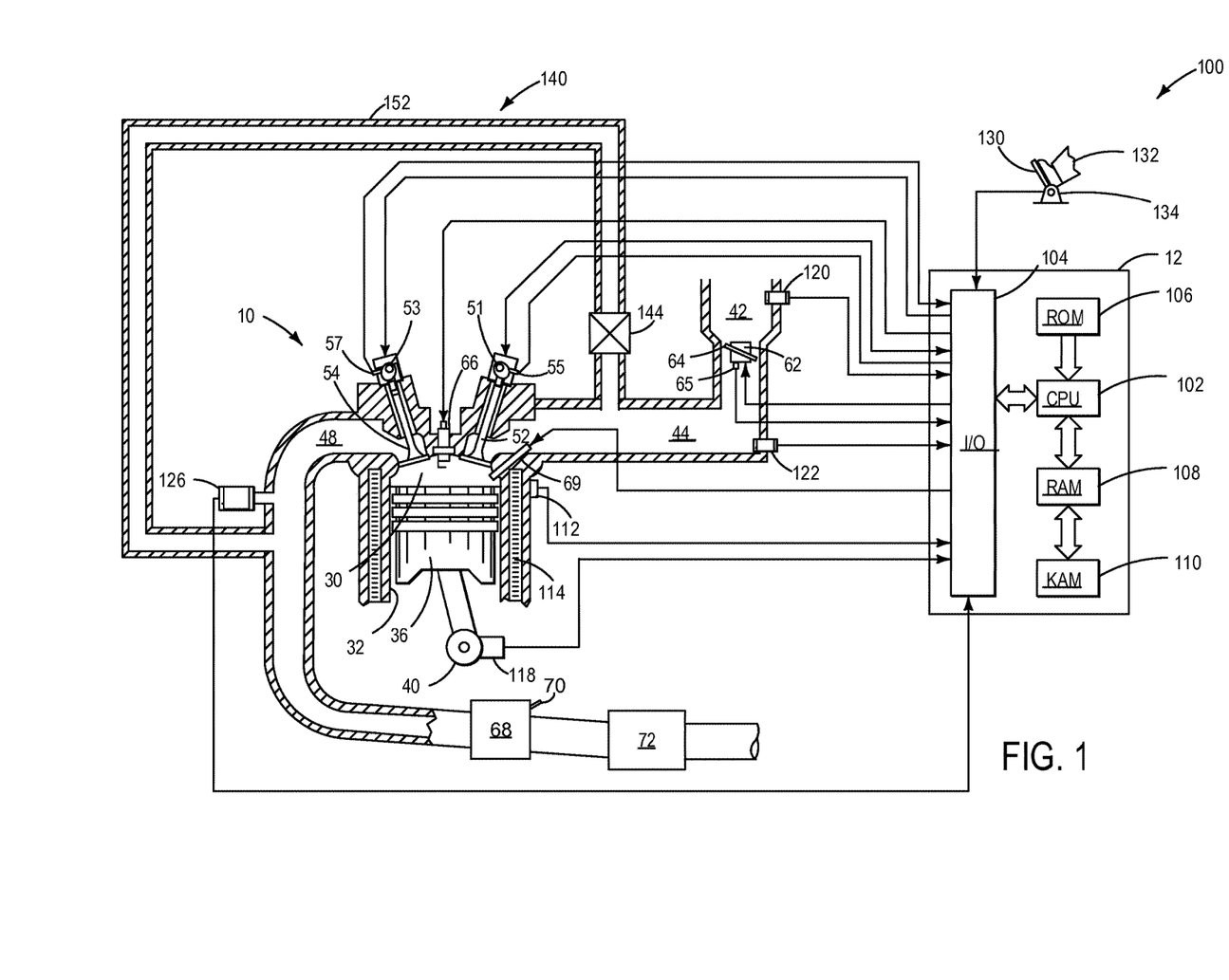
FIG. 1 shows an engine schematic.
Figure 2:
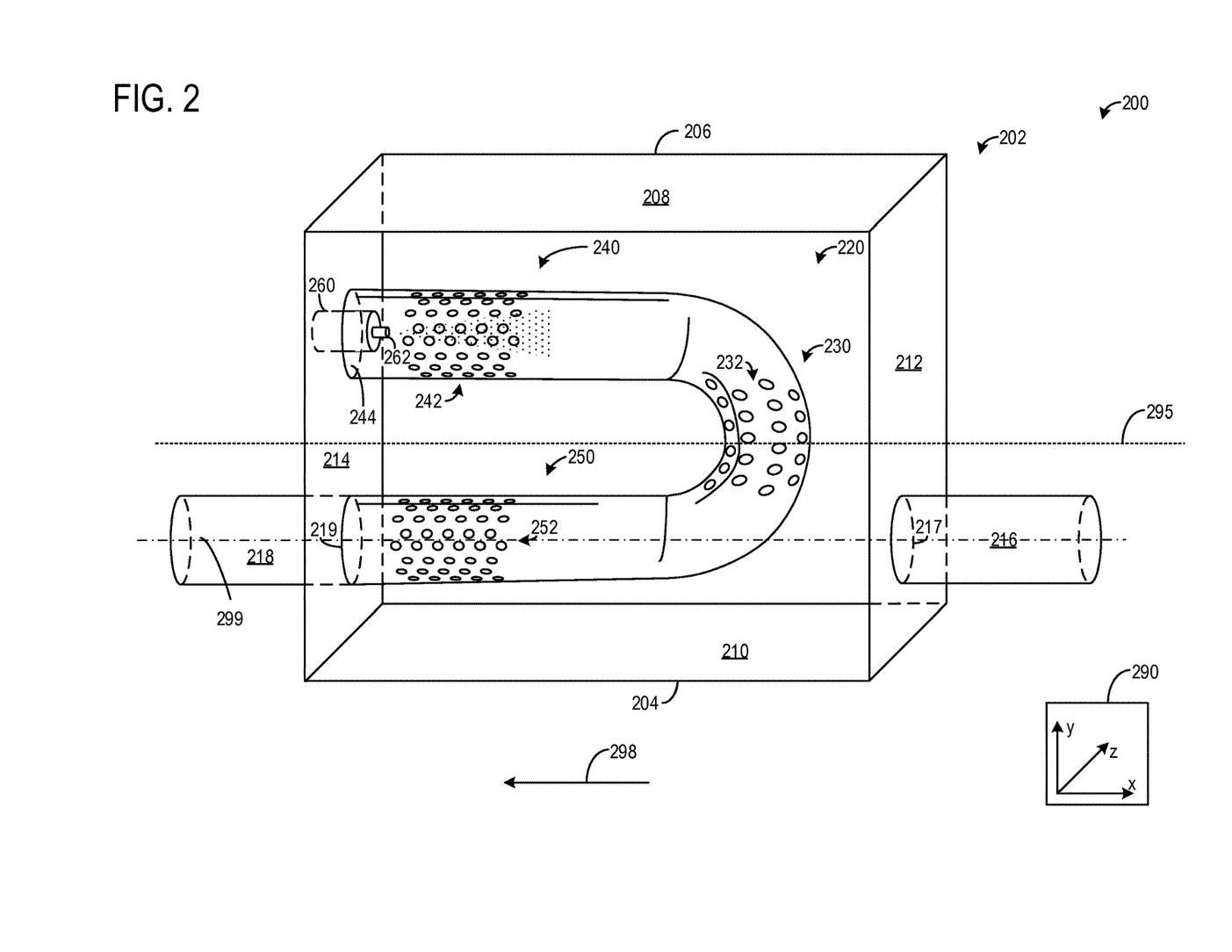
FIG. 2 shows a side-on perspective view of a perforated tube housed within a mixing chamber.
Figure 4:
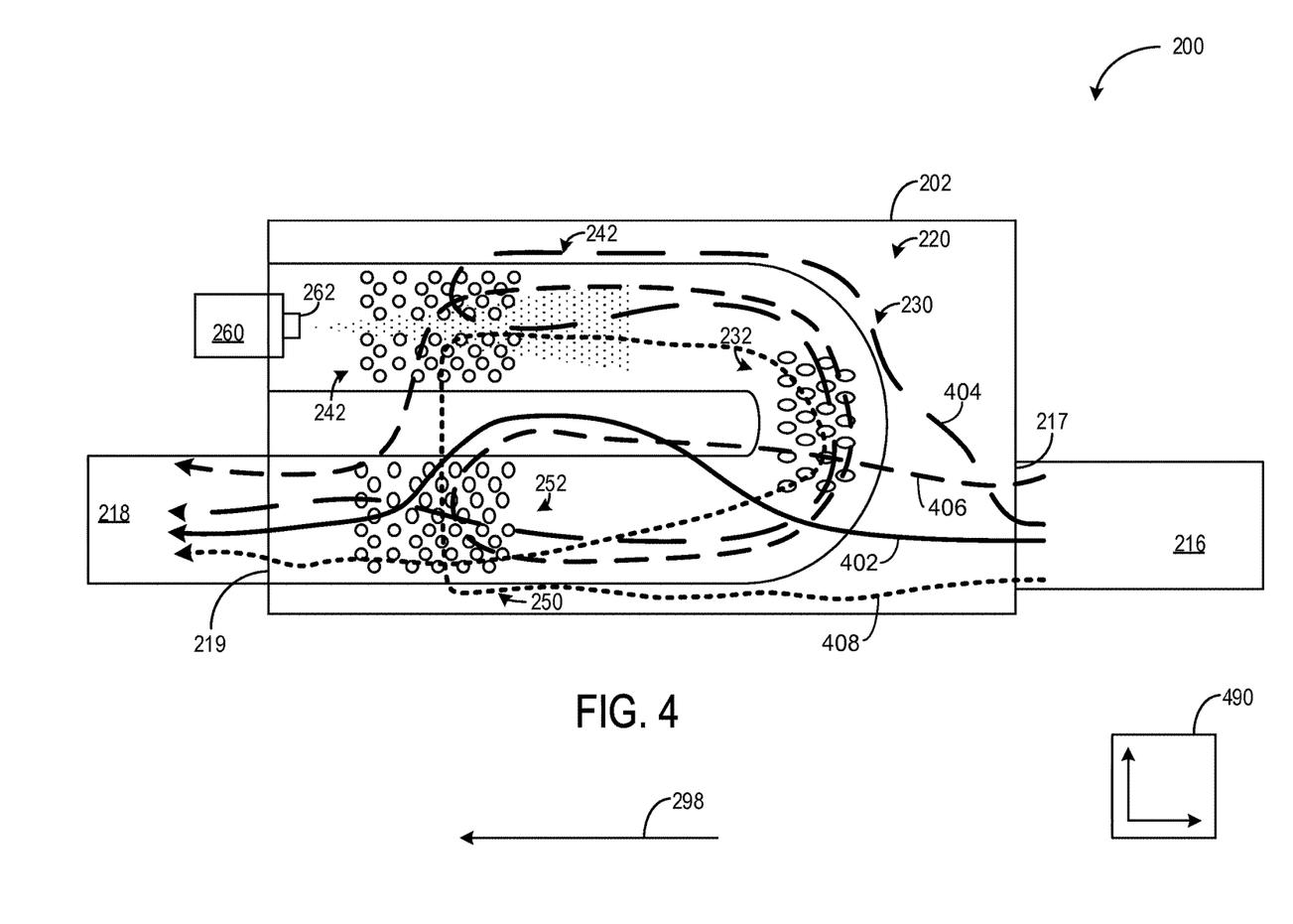
FIG. 4 shows a side-on planar view of the perforated tube housed within the mixing chamber along with example flow paths for gas.

The following description relates to an example of a mixer comprising a perforated tube housed in a mixing chamber. An engine coupled to the mixer is shown in FIG. 1. In FIG. 2, a side-on perspective view of the mixing chamber and the perforated tube are shown. The perforated tube is a single tube with perforations along a body of the tube. The mixing chamber fluidly connects an upstream exhaust passage with a downstream exhaust passage. Exhaust from the upstream exhaust passage flows through the perforated tube before flowing into the downstream exhaust passage. A downstream-to-upstream face-on view of the perforated tube with the mixing chamber is shown in FIG. 4.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 72 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 72 is shown arranged along the exhaust passage 48 downstream of both the exhaust gas sensor 126 and a mixer 68. The device 72 may be a three way catalyst (TWC), $NO_x$ trap, selective catalytic reductant (SCR), various other emission control devices, or combinations thereof. In some examples, during operation of the engine 10, the emission control device 72 may be periodically reset by operating at least one cylinder of the engine within a particular air-fuel ratio.

The mixer 68 is shown upstream of the emission control device 72 and downstream of the exhaust gas sensor 126. In some embodiments, additionally or alternatively, a second exhaust gas sensor may be located between the mixer 68 and the emission control device 72. The mixer 68 comprises a mixing chamber with a perforated tube located therein. The mixer 68 fluidly couples upstream and downstream portions of the exhaust passage 48, wherein the upstream and downstream portions are physically disconnected and spaced away from each other. The mixer 68 may further comprise an injector 70, which may be fluidly coupled to the perforated tube. In one example, the injector 70 is a urea injector.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting an oxidation state of the SCR may include adjusting an actuator of the urea injector to inject urea to reduce the SCR.

The mixer comprises a urea injector for injecting urea inside a perforated tube housed by a mixing chamber. The tube has an outlet fluidly coupled with a downstream exhaust passage, at a downstream side of the mixing chamber, leading to a remaining portion of an exhaust system. One or more of an exhaust aftertreatment device and an exhaust sensor may be located downstream of the outlet. An upstream exhaust passage is fluidly coupled to an upstream side of the mixing chamber via an inlet. Exhaust gas enters the chamber only via the inlet and exits the chamber only via the outlet into the downstream exhaust passage. The mixing chamber and the perforated tube are hollow, and wherein the gas flows through a volume of one or more of the mixing chamber and the perforated tube. Gas may enter the perforated tube via perforations located along the tube. Gas flowing out of the perforations does not flow out of the mixing chamber. Gas flows out of the mixing chamber by flowing into the perforated tube and flowing out the outlet on the downstream side. The injector protrudes through a port located above the outlet on the downstream side and injects urea into the perforated tube under some conditions. Gas does not flow through the port. In this way, exhaust gas may flow through the perforated tube simultaneous to a urea injection into the tube, allowing the exhaust gas to flow into and mix with the urea injection prior to exiting the mixing chamber so that the injection is evenly dispersed about the exhaust gas. Alternatively, the gas may be mixed in the mixer in the absence of a urea injection such that a homogeneity of exhaust gas is increased compared to a composition of exhaust gas in the upstream exhaust passage. The mixer will be described with greater detail herein.

FIG. 2 shows a side-on perspective view of a mixer 200 with a mixing chamber 202 and a perforated tube 220 located therein. The perforated tube 220 is a contiguous and uninterrupted passage for mixing liquids and or gases in the mixing chamber 202. In the current depiction, a front side 204 of the mixing chamber 202 is transparent. Large dash lines indicate features of the mixer 200 behind other components of the mixer 200 along a z-axis.

An axes system 290 is shown comprising three axes, an x-axis in the horizontal direction, a y-axis in the vertical direction, and the z-axis in a direction perpendicular to both the x and y axes. Thus, features in dashed lines are farther along the z-axis than features in solid lines. A central axis 295 of the mixer 200 is depicted by a small dash line. Small dashes are smaller than large dashes. The central axis 295 is substantially parallel to the x-axis. Arrow 298 depicts an overall direction of exhaust flow. Axis 299 passes through both the inlet and outlet centers, as shown by a dash-dot line.

The mixing chamber 202 comprises six sides, namely a front side 204, a back side 206, a top side 208, a bottom side 210, an upstream side 212, and a downstream side 214. The front side 204 is spaced away from the back side 206 along the z-axis. The top side 208 is spaced away from the bottom side 210 along the y-axis. The upstream side 212 is spaced away from the downstream side 214 along the x-axis. In one example, the mixing chamber 202 is a rectangular prism with a greatest length along the x-axis. In another example, the mixing chamber 202 is a cube. It will be appreciated by someone skilled in the art that the mixing chamber may be other suitable shapes such as a sphere, triangular prism, triangular pyramid, etc.

The mixing chamber 202 is hollow and hermetically sealed from an ambient atmosphere. The mixing chamber 202 may comprise of a heat-resistant material, which may be rigid or flexible. The mixing chamber 202 may be at least partially filled with exhaust gas and allow exhaust flow to ricochet off interior surfaces of the chamber, generating increased exhaust turbulence to increase exhaust mixing.

An upstream exhaust passage 216 is welded to the upstream side 212, below the central axis 295, and fluidly coupled to an interior of the mixing chamber via an inlet 217 at a first end of the upstream passage 216. The upstream exhaust passage 216 does not extend into the mixing chamber 202. In one embodiment, additionally or alternatively, the upstream exhaust passage 216 may extend into the mixing chamber 202 in a linear or bent directions. At a second end, the upstream exhaust passage 216 is fluidly coupled to an exhaust manifold. A turbine may be located in the upstream exhaust passage 216 between the exhaust manifold and the mixing chamber 202. Alternatively, the upstream exhaust passage 216 may uninterruptedly receive exhaust from the exhaust manifold.

A downstream exhaust passage 218 is disconnected and spaced away from the upstream exhaust passage 216 by a length of the front side 204. The length is exactly 10 centimeters in one example. In another example, the length is less than or greater than 10 centimeters. The downstream exhaust passage 218 is welded to the downstream side 214 below the central axis 295 and fluidly coupled to the perforated tube 220 via an outlet 219. Exhaust gas flowing from the upstream exhaust passage 216 flows into the mixing chamber 202, through the perforated tube 220, and through the outlet 219 before flowing into the downstream exhaust passage 218. The outlet 219 is aligned with and spaced away from the inlet 217 along the x-axis. In one example, the outlet 219 may be misaligned with the inlet 217 along one or more of the x, y, and z-axes and located at a different height, width, and/or depth of the mixing chamber 202. The downstream exhaust passage 218 may direct exhaust gas to one or more of an exhaust aftertreatment device, a gas sensor, and/or a muffler. The downstream exhaust passage 218 is farther away from an engine than the upstream exhaust passage 216.

The upstream exhaust passage 216 directs exhaust gas into the mixing chamber 202, where the exhaust gas flows through the volume of the mixing chamber. Additionally, the exhaust gas flows through the perforated tube 220 before flowing into the downstream exhaust passage 218. In this way, exhaust gas homogeneity is increased in the downstream exhaust passage 218 compared to in the upstream exhaust passage 216.

The perforated tube 220 is a symmetric, contiguous tube located within the mixing chamber 202. The perforated tube 220 comprises a passage located therein capable of guiding a liquid and/or gas flow. The tube 220 is convexly bent and comprises a substantially U-shaped cross-section. A bend 230 is proximal to the upstream side 212 and connects an upper linear portion 240 and a lower linear portion 250 of the perforated tube 220. The upper linear portion 240 is spaced away from the lower linear portion 250 along the y-axis. The upper linear portion 240 and the lower linear portion 250 are physically coupled to the downstream side 214 while being spaced away from the five remaining sides of the mixing chamber 202. The bend 230 is spaced away from the six sides of the mixing chamber 202.

An upper interface between the bend 230 and the upper linear portion 240 is proximal to the top side 208 and a lower interface between the bend 230 and the lower linear portion 250 is proximal to the bottom side 210. A plurality of first perforations 232 are located along an entire circumference of a portion of the bend 230 between the upper and lower interfaces. The first perforations 232 may be substantially equal or different in size to each other. The first perforations 232 fluidly connect the bend 230 to the mixing chamber 202. Gas flowing out of the first perforations 232 may flow toward any of the six sides of the mixing chamber 202. Gas flowing out the first perforations 232 does not directly exit the mixing chamber 202.

The upper linear portion 240 comprises a plurality of second perforations 242 located along an entire circumference for a portion of the upper portion 240 between a port 244 and the upper interface. The second perforations 242 may be substantially equal or different in size to each other. The second perforations 242 may be bigger than, smaller than, or substantially equal in size to the first perforations 232. Additionally or alternatively, a number of second perforations 242 may be greater than, less than, or equal to a number of first perforations 232. The second perforations 242 fluidly couple the upper linear portion 240 to the mixing chamber 202. Gas flowing out of the second perforations 232 may flow toward any of the six sides of the mixing chamber 202. Gas flowing out the second perforations 242 does not directly exit the mixing chamber 202.

The port 244 is an opening located on the downstream side 214 proximal to the top side 208. The port 244 receives an injector 260, where the injector protrudes through the port with a nozzle 262 located inside the upper linear portion 240. As shown, the injector 260 is injecting a mist into the upper linear portion 240. In one example, the injector 260 is a urea injector and the mist is urea. The injector 260 is parallel to the x-axis and injects urea in a direction substantially opposite to arrow 298 in the upstream exhaust passage. In this way, an increased amount of turbulence may be generated when the exhaust gas comes into contact with the mist. Exhaust gas may flow into the first linear portion through the second perforations 242 or may flow through a passage of the perforated tube 220 from the bend 230 or the lower linear portion 250. The port 244 is hermetically sealed and exhaust gas may not flow through the port. In this way, exhaust gas may only flow into and/or out of the mixing chamber 202 via the inlet 217 and the outlet 219, respectively. There are no other inlets and no additional outlets in the mixing chamber 202 other than those specified.

The lower linear portion 250 comprises a plurality of third perforations 252 located around its entire circumference for a portion of the lower portion 250 between outlet 219 and lower interface. The third perforations 252 may be substantially equal or different in size to each other. The third perforations 252 may be bigger than, smaller than, or substantially equal in size to the first perforations 232 and/or the second perforations 242. Additionally or alternatively, a number of third perforations 252 may be greater than, less than, or equal to a number of first 232 or second 242 perforations. The third perforations 252 fluidly couple the lower linear portion 250 to the mixing chamber 202. Gas flowing out of the third perforations 252 may flow toward any of the six sides of the mixing chamber 202. Gas flowing out the third perforation does not directly exit the mixing chamber 202. Gas in the lower linear portion 250 may flow toward one or more of the bend 230 via the interior passage, out the perforations 252, and through the outlet 219 and into the downstream exhaust passage 218 where the gas is directed to a remainder of an exhaust system. In one example, exhaust flowing out of the mixing chamber 202 from the lower linear portion 250 to the downstream exhaust passage 218 may flow directly to the SCR catalyst.

As depicted, the lower linear portion 250 is aligned with the upstream exhaust passage 216 and the downstream exhaust passage 218 along the x-axis. Gas from the upstream passage 216 may flow into the mixing chamber 202, through the lower linear portion 250, and into the downstream exhaust passage 218 via the outlet 219. Gas may not exit the mixing chamber 202 by flowing through the port 244 or the first 232, second 242, and third 252 perforations. The upper linear portion 240 and the bend 230 are misaligned with the upstream exhaust passage 216 and the downstream exhaust passage 218.

Gas flowing into the mixing chamber 202 from the upstream exhaust passage may flow in myriad directions. Gas may flow through second perforations 242 and mix with a urea injection before flowing out the chamber 202 via the lower linear portion 250. Gas may mix in the mixing chamber in the presence or absence of a urea injection. Gas flow in the chamber is described in further detail in FIG. 4.

Figure 3:
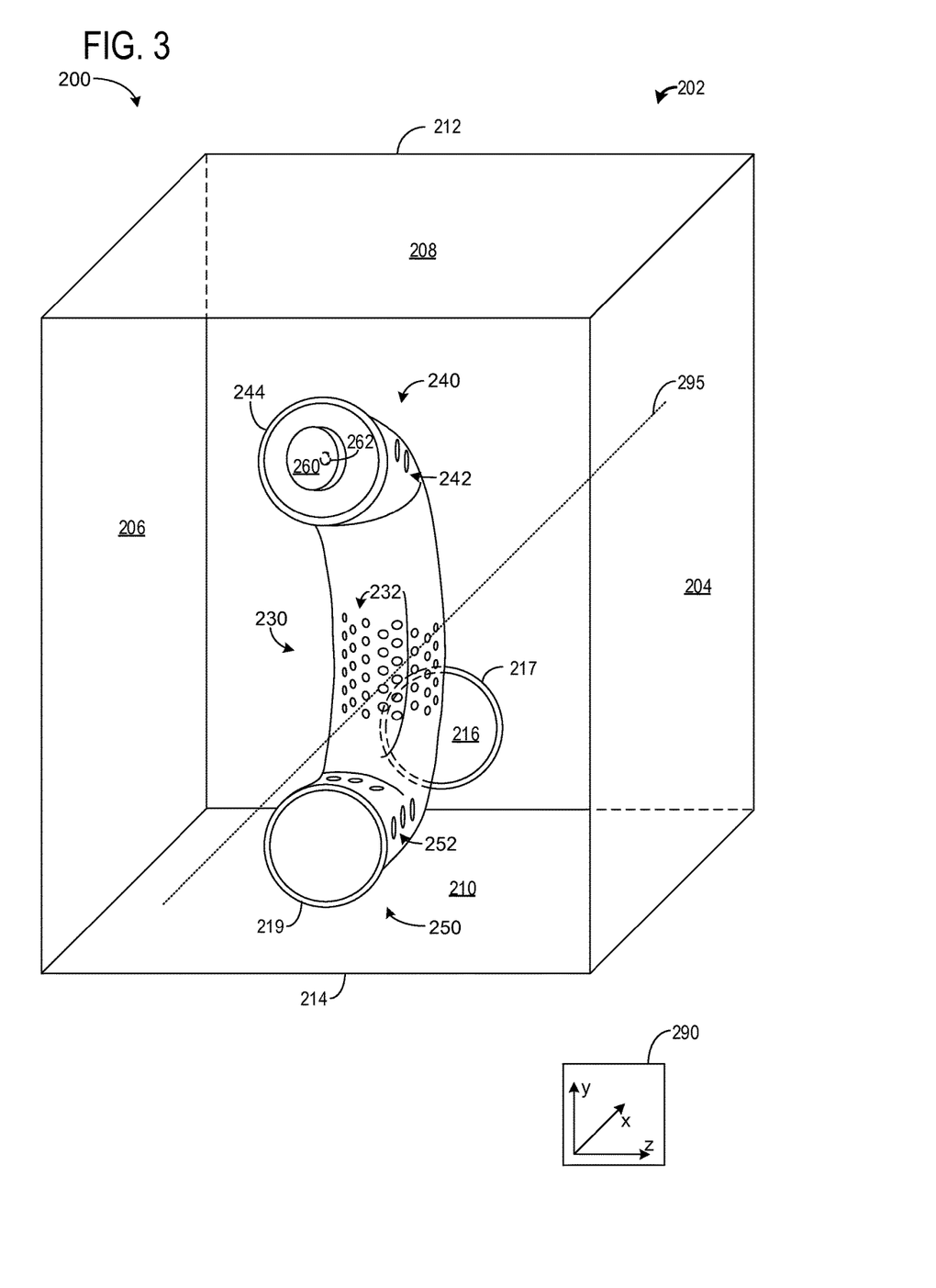
FIG. 3 shows a face-on perspective view of the perforated tube housed within the mixing chamber.

FIG. 3 shows a downstream-to-upstream face-on view of the mixer 200 of FIG. 2. As such, components previously introduced are numbered similarly in subsequent figures. In the current depiction, a downstream side 214 is omitted. Large dash lines indicate features of the mixer 200 behind other components of the mixer 200 along the x-axis.

An axes system 290 is shown comprising three axes, a y-axis in the vertical direction, a z-axis in the horizontal direction, and an x-axis orthogonal to both the y and z axes. Thus, features with the large dash outline are farther along the x-axis than features with a solid outline. A central axis 295 of the mixer 200 is depicted by a small dash line, wherein small dashes are smaller than large dashes. The central axis 295 is substantially parallel to the x-axis. Arrow 298 depicts an overall direction of exhaust flow.

The mixer 200 comprises a mixing chamber 202 with a perforated tube 220 located therein. The perforated tube 220 is contiguous and comprises a bend 230 with first perforations 232, an upper linear portion 240 with second perforations 242, and a lower linear portion 250 with third perforations 252. As shown, the first perforations 232 span a portion of the bend in the y-axis while completely spanning an entire circumference of the bend 230. An interior passage spans an entire length of the tube 220. The perforations span an entire circumference of the respective portions of the perforated tube 220. The perforations fluidly couple the perforated tube 220 to the mixing chamber 202.

An injector 260, for injecting media with a nozzle 262, extends through a port 244 and is fluidly coupled to the upper linear portion 240. The injector 260 is angled directly opposite to arrow 298. Thus, a direction of media injected is opposite to a direction of gas flow thereby, increasing mixing of the gas and media. The injector 260 may provide an atomized spray of media (e.g., urea) to the upper portion 240 to improve mixing.

The lower linear portion 250 is fluidly coupled with a downstream exhaust passage (not shown) via the outlet 219. The outlet 219 is the only opening to the downstream passage in the mixing chamber 202. An upstream exhaust passage 216 is aligned with the lower linear portion 250 and the downstream exhaust passage. The upstream passage 216 receives exhaust gas from an exhaust manifold and directs the exhaust gas to the mixing chamber 202. The upstream passage 216 is not physically coupled to and is spaced away from the downstream passage along the x-axis. The upstream passage 216 is physically coupled to an upstream side 212 of the mixing chamber 202 via at least one weld.

Gas may fill a volume of the mixing chamber and interact with the perforated tube. Gas may flow in and out of the bend 230, upper portion 240, and lower portion 250 via the first 232, second 242, and third 252 perforations. Gas may also flow along an entirety of the interior passage. Additionally, gas may flow out of the lower portion 250 via the outlet 219. Gas flowing through the outlet 219 flows into the downstream passage and exits the mixing chamber 202. Thus, gas may only exit the mixing chamber 202 by flowing into the lower portion 250 and out through the outlet 219.

As described above, gas increases in homogeneity after flowing through the mixer 200. Urea may be evenly distributed and mixed with the exhaust gas during vehicle operation. A concentration of urea is substantially equal for portions of the gas sampled in the downstream exhaust passage. In this way, urea may be evenly delivered to a SCR catalyst located downstream of the mixing chamber. By doing this, a homogeneity of exhaust gas in the downstream passage is greater compared to in the upstream passage. The mixed exhaust gas may flow to an exhaust gas sensor located in the downstream passage.

FIG. 4 shows a side-on two dimensional view of the mixer 200. Sample exhaust flows from the upstream exhaust passage 216 to the downstream exhaust passage 218 through the mixing chamber 202 and the perforated tube 220 are shown. It will be appreciated by someone skilled in the art that myriad exhaust flows through the mixer 200 are possible and FIG. 4 simply depicts a number of possible exhaust flows. Furthermore, FIG. 4 does not depict exhaust flow in three-dimensions (a z-axis has been omitted), but it should be noted that the exhaust may flow in a third dimension toward front and back sides of the mixing chamber 202. Dashed lines depict gas and/or a gas/urea mixture behind the perforated tube 220. Additionally, FIG. 4 shows exhaust mixing concurrent with a urea injection, however, exhaust flows may be substantially similar in an absence of a urea injection. In this way, the mixer 200 may increase a homogeneity of exhaust gas with or without urea.

An axis system 490 is shown with two axes, an x-axis in the horizontal direction and a y-axis in the vertical direction. Arrow 298 depicts an overall direction of exhaust flow in upstream 216 and downstream 218 exhaust passages.

Four substantially different flows are illustrated, namely a first flow 402, second flow 404, third flow 406, and a fourth flow 408. The first flow 402 is indicated by a solid line. The second flow 404 is indicated by a large dashed line. The third flow 406 is indicated by a medium dash line. The fourth flow 408 is indicated by a small dash line. Large dashes are bigger than medium and small dashes. Gas in the upstream exhaust passage 416 is less homogenous than gas in the downstream exhaust passage 418. Therefore, the flows may comprise different compositions of combustion byproducts or reactants (e.g., oxygen, $CO_2$, soot, fuel, urea, nitrogen, etc.). The flows may interact with one another within the mixing chamber 202 and/or the perforated tube 220. The flows may flow parallel with, orthogonal to, and/or perpendicular to each other in the mixing chamber 202 and/or the perforated tube 220, where the flows may cross paths and combine with one another increasing in homogeneity.

The first flow 402 flows from the upstream exhaust passage 216 and into the mixing chamber 202 before flowing behind the lower linear portion 250. The first flow 402 flows through the third perforations 252, into the lower linear portion 250, through the outlet 219, and into the downstream exhaust passage 218.

The second flow 404 flows from the upstream exhaust passage 216 and into the mixing chamber 202 before flowing up along the y-axis toward the upper linear portion 240. After entering the upper linear portion 440 and mixing with the injection, the second flow 404 flows through the interior passage of the perforated tube 220 to the lower linear portion 450 before flowing out the mixing chamber 202 and into the downstream exhaust passage 218 via the outlet 219. In this way, a mixture of exhaust gas and the injection (e.g., urea) flow through the three portions of the perforated tube 220.

The third flow 406 flows from the upstream exhaust passage 216 and into the mixing chamber 202 before flowing past the bend 230 and into the lower linear portion 250 via the third perforations 252. The third flow 406 flows up the interior passage, through the bend 230, and into the upper linear portion 240 where the third flow may mix with the injection. The third flow 406 flows out the second perforations 242 before flowing toward the lower linear portion 450. The third flow 406 flows through the third perforations 552, into the lower linear portion 450, out the mixing chamber 202, and into the downstream exhaust passage 218 via the outlet 219.

The fourth flow 408 flows from the upstream exhaust passage 216 and into the mixing chamber 202 before flowing through a lower portion of the lower linear portion 450 via the third perforations 252. The fourth flow 408 flows out the third perforations 452 toward the upper linear portion 450. The fourth flow 408 flows into the upper linear portion 450 via the second perforations 442, where the fourth flow may mix with the injection. After entering the upper linear portion 440 and mixing with the injection, the fourth flow 408 flows through the interior passage of the perforated tube 220, through the bend 430, to the lower linear portion 450 before flowing out the mixing chamber 202 and into the downstream exhaust passage 218 via the outlet 219.

Additionally or alternatively, exhaust may flow from the upstream exhaust passage 216 and into the mixing chamber 202 before flowing up along the y-axis toward the upper linear portion 240. The exhaust flows through the second perforations 442 and mixes with the injection. The exhaust flow may be orthogonal to, oblique to, and/or parallel to the injection. The mixture of the injection and the exhaust flow out the second perforations, down into the lower linear portion 450 via the third perforations 452, and out the mixing chamber 202 into the downstream exhaust passage 218 via the outlet 219.

Another example of exhaust flow flows from the upstream exhaust passage 216 and into the mixing chamber 202 before flowing behind the bend 230. The exhaust flows into the bend 230 through the furthest downstream perforations of the first perforations 432. The exhaust flows through the interior passage of the perforated tube 220 to the lower linear portion 450 before flowing out the mixing chamber 202 and into the downstream exhaust passage 218 via the outlet 219.

A further example of exhaust flow flows from the upstream exhaust passage 216 and into the mixing chamber 202 before flowing into the bend 230 via the furthest upstream perforations of the first perforations 232. The exhaust flow flows up the interior passage toward the upper linear portion 440. The exhaust flow flows in a direction opposite a direction of the injection. The exhaust flow mixes with the injection before flowing through the second perforations 442 toward the lower linear portion 450. The exhaust flows through the third perforations 552, into the lower linear portion 450, out the mixing chamber 202, and into the downstream exhaust passage 418 via the outlet 419.

In this way, a compact, easy to manufacture mixer, which is able to accommodate a variety of exhaust passage geometries, may be located upstream of a variety of exhaust system components in order to increase an accuracy of a sensor reading or to improve efficacy of exhaust aftertreatment devices. The mixer comprises a mixing chamber fluidly coupling an upstream exhaust passage to a downstream exhaust passage. A perforated tube is located within the mixing chamber and fluidly coupled with the downstream exhaust passage. Exhaust from the upstream exhaust passage flows through the perforated tube before flowing into the downstream exhaust passage. The technical effect of placing an exhaust mixer in an exhaust conduit is to improve an exhaust gas mixture homogeneity such that components downstream of the mixer may increase functionality.

One Example of this:

A system for a mixer includes a urea injector injecting urea inside a perforated tube housed by a mixing chamber, the tube having an outlet end fluidly coupled with an exhaust passage and an SCR catalyst positioned downstream of the exhaust passage. In a first example of the system where the exhaust passage is a downstream exhaust passage, further comprising an upstream exhaust passage physically coupled to an upstream side of the mixing chamber, and where the upstream exhaust passage is disconnected from the downstream exhaust passage. A second example of the system optionally including the first example where exhaust gas from the upstream passage flows through an inlet between the upstream passage and the mixing chamber, through perforations of the tube, and through the outlet end into the downstream exhaust passage. A third example of the system optionally includes one or more of the first and second examples, and further includes where exhaust gas enters the chamber only via the inlet and exits the chamber only via the outlet. A fourth example of the system optionally includes one or more of the first through third examples, and further includes the tube comprises an upper linear portion, a lower linear portion, and a bend, and wherein the bend is between the upper linear portion and the lower linear portion. A fifth example of the system optionally includes one or more of the first through fourth examples, and further includes the urea injector is fluidly coupled to the upper linear portion via an inlet port. A sixth example of the system optionally includes one or more of the first through fifth examples, and further includes the perforated tube comprises a U-shaped cross-section. A seventh example of the system optionally includes one or more of the first through sixth examples, and further includes the perforated tube is welded to downstream wall of the mixing chamber and spaced away from remaining walls of the mixing chamber. An eighth example of the system optionally include one or more of the first through seventh examples, and further includes perforations of the tube spanning an entire circumference of the tube for a length of the tube.

A mixer includes a mixing chamber with a downstream side and an upstream side, an inlet of the upstream side fluidly coupled with an upstream exhaust passage, an outlet of the downstream side fluidly coupled with a downstream exhaust passage, and a bent perforated tube located inside the mixing chamber comprising a lower portion fluidly coupled with the outlet and an upper portion fluidly coupled with an injector via a port on the downstream side of the mixing chamber. A first example of the mixer includes the port is directly above and aligned with the outlet along a vertical axis. A second example optionally including the first example includes the perforated tube is symmetric about a central axis. A third example optionally including the first and/or second examples, and further includes where the inlet and outlet are spaced away from each other and aligned along a horizontal axis. A fourth example optionally including one or more of the first through third examples, and further includes where the perforated tube is stationary and is welded to the downstream side of the mixing chamber. A fifth example optionally including one or more of the first through fourth examples, and further includes where the perforated tube is hollow. A sixth example optionally including one or more of the first through fifth examples, and further includes where there are no other inlets and no additional outlets in the mixing chamber other than those specified. A seventh example optionally including one or more of the first through sixth examples, and further includes the perforated tube is a single body, contiguous tube.

An exhaust gas mixer includes an upstream exhaust passage physically coupled to an upstream side of a mixing chamber and fluidly coupled to an interior of the mixing chamber via an inlet, a downstream exhaust passage physically coupled to a downstream side of the mixing chamber and fluidly coupled to a perforated tube in the mixing chamber via an outlet, and where the outlet is aligned with the inlet along a horizontal axis, and a lower portion of the perforated tube fluidly coupled to the outlet and an upper portion of the perforated tube fluidly coupled with a port for a urea injector located vertically above the outlet along the downstream side. A first example of the exhaust gas mixer includes where the lower portion and the upper portion are fluidly coupled via a bend in the perforated tube, and where the lower portion, the upper portion, and the bend comprise perforations. A second example of the exhaust gas mixer optionally including the first example further includes where exhaust gas from the upstream exhaust passage mixes within at least the lower portion of the perforated tube before exiting through the outlet to the downstream exhaust passage.

In another representation, an exhaust system for an engine of a vehicle includes a mixing chamber having an inlet and outlet for exhaust gas flow. The chamber also includes a tube therein with an inlet coupled to another reductant injection inlet of the chamber, and an outlet of the tube forming the outlet for exhaust gas flow out of the chamber. The only inlets for exhaust gas in the tube are a plurality of perforations in the tube walls (not at the inlet or outlet of the tube) the enable flow from inside the chamber to inside the tube, that flow than being directed through the tube to the outlet (of the tube/chamber combined). The injector is positioned to direct reductant inside the tube, without exhaust gas also entering that same inlet of the tube (where reductant is injected). Rather, the perforations enable exhaust gas from the chamber inlet to enter the tube before reaching the chamber outlet. The only way, in some examples, for exhaust gas entering the chamber interior to reach the chamber exit is through the perforations and then the tube to the outlet. Gas cannot reach the outlet unless it passes through the tube's perforations. This forces improved mixing with the reductant over the length of the tube when the perforations span the length of a majority of the tube. As shown in the figures, the tube may form two 90-degree bends about a central axis of the mixer, such that the tubes respective complete ends are each attached to the same side of the chamber. While the chamber may be box-like, other geometries, including rounded geometries, are possible. In one example, there is only a single tube within the chamber, and no other tubes, inlets, or outlets. Again, these structural features can provide improved mixing with the reductant, yet at the same time reduce reductant coking and deposits since forced exhaust gas is directly mixed with the reductant, but the reductant is generally blocked by the tube walls from reaching the chamber walls (where coking would be more likely due to lower temperatures).

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a urea injector injecting urea inside a perforated tube having a U-shaped bend, housed by a mixing chamber configured to receive exhaust gas via an inlet of an upstream exhaust passage, a central axis of the inlet intersecting the tube at a region of bend at an offset from a center of the bend, the upstream exhaust passage physically coupled to an upstream side of the mixing chamber, the tube having an outlet end fluidly coupled with a downstream exhaust passage and an SCR catalyst positioned downstream of the downstream exhaust passage, where the downstream exhaust passage is disconnected from the upstream exhaust passage.

2. The system of claim 1, wherein exhaust gas from the upstream exhaust passage flows unobstructed through the inlet between the upstream exhaust passage and the mixing chamber, through perforations of the tube, and through the outlet end into the downstream exhaust passage.

3. The system of claim 2, wherein exhaust gas enters the chamber only via the inlet and exits the chamber only via the outlet end.

4. The system of claim 1, wherein the tube comprises an upper linear portion, a lower linear portion, and the bend, and wherein the bend is between the upper linear portion and the lower linear portion.

5. The system of claim 4, wherein the urea injector is fluidly coupled to the upper linear portion via an inlet port.

6. The system of claim 1, wherein the perforated tube is welded to a downstream wall of the mixing chamber and is spaced away from remaining walls of the mixing chamber.

7. The system of claim 1, wherein perforations of the tube span an entire circumference of the tube for one or more lengths of the tube, with a length of perforation occurring in the bent region of the tube.

8. A mixer, comprising:
a mixing chamber with a downstream side and an upstream side;
an inlet of the upstream side fluidly coupled with an upstream exhaust passage;
an outlet of the downstream side fluidly coupled with a downstream exhaust passage;
a perforated tube having a U-shaped bend located inside the mixing chamber comprising a lower portion fluidly coupled with the outlet and an upper portion fluidly coupled with an injector via a port on the downstream side of the mixing chamber;
wherein the inlet and outlet are spaced away from each other and a central axis of the inlet intersects the perforated tube at a region of bend at an offset from a center of the bend.

9. The mixer of claim 8, wherein the port is directly above and aligned with the outlet along a vertical axis.

10. The mixer of claim 8, wherein the perforated tube is symmetric about the center of the bend.

11. The mixer of claim 8, wherein the perforated tube is stationary and is welded to the downstream side of the mixing chamber.

12. The mixer of claim 8, wherein the perforated tube is hollow.

13. The mixer of claim 8, wherein there are no other inlets and no additional outlets in the mixing chamber other than those specified.

14. The mixer of claim 8, wherein the perforated tube is a single body, contiguous tube.

15. An exhaust gas mixer, comprising:
an upstream exhaust passage physically coupled to an upstream side of a mixing chamber and fluidly coupled to an interior of the mixing chamber via an inlet;
a downstream exhaust passage physically coupled to a downstream side of the mixing chamber and fluidly coupled to a perforated tube having a U-shaped bend in the mixing chamber via an outlet, and where the outlet is aligned with the inlet along a central axis of the inlet, the central axis of the inlet intersecting the perforated tube at a region of bend at an offset from a center of the bend; and
the lower portion of the perforated tube fluidly coupled to the outlet and an upper portion of the perforated tube fluidly coupled with a port for a urea injector located vertically above the outlet along the downstream side.

16. The exhaust gas mixer of claim 15, wherein the lower portion and the upper portion are fluidly coupled via the bend in the perforated tube, and where the lower portion, the upper portion, and the bend comprise perforations.

17. The exhaust gas mixer of claim 15, wherein exhaust gas from the upstream exhaust passage mixes within at least the lower portion of the perforated tube before exiting through the outlet to the downstream exhaust passage.

* * * * *